(12) United States Patent
Shin et al.

(10) Patent No.: US 11,156,535 B2
(45) Date of Patent: Oct. 26, 2021

(54) SMALL-PUNCH TEST APPARATUS FOR QUANTITATIVELY EVALUATING MATERIAL EMBRITTLEMENT BEHAVIOR UNDER VARIOUS GASEOUS HYDROGEN ENVIRONMENTS

(71) Applicant: ANDONG NATIONAL UNIVERSITY INDUSTRY-ACADEMIC COOPERATION FOUNDATION, Andong-si (KR)

(72) Inventors: Hyung Seop Shin, Andong-si (KR); Kyung Oh Bae, Gyeongsan-si (KR)

(73) Assignee: Andong National University Industry-Academic Cooperation Foundation, Andong-si (KR)

( * ) Notice: Subject to any disclaimer, the term of this patent is extended or adjusted under 35 U.S.C. 154(b) by 135 days.

(21) Appl. No.: 16/789,859

(22) Filed: Feb. 13, 2020

(65) Prior Publication Data

US 2020/0182761 A1 Jun. 11, 2020

Related U.S. Application Data

(63) Continuation of application No. PCT/KR2018/010789, filed on Sep. 13, 2018.

(30) Foreign Application Priority Data

Oct. 26, 2017 (KR) ........................ 10-2017-0140180

(51) Int. Cl.
| | |
|---|---|
| *G01N 3/18* | (2006.01) |
| *G01N 3/30* | (2006.01) |
| *G01N 3/20* | (2006.01) |
| *G01N 3/02* | (2006.01) |

(52) U.S. Cl.
CPC ................ *G01N 3/20* (2013.01); *G01N 3/02* (2013.01)

(58) Field of Classification Search
CPC .. G01N 3/18; G01N 3/32; G01N 3/02; G01N 3/12; G01N 17/02; G01N 17/00;
(Continued)

(56) References Cited

U.S. PATENT DOCUMENTS

| 4,393,716 A * | 7/1983 | Clark ........................ G01N 3/16 374/51 |
| 9,678,025 B1 * | 6/2017 | Fesmire ................. G01N 25/72 |
| 2013/0023419 A1 * | 1/2013 | Matsushita ............ H01B 3/306 505/230 |

FOREIGN PATENT DOCUMENTS

| JP | 2014-077696 A | 5/2014 |
| KR | 10-2001-0086816 A | 9/2001 |

(Continued)

OTHER PUBLICATIONS

Office Action of Korean Patent Application No. 10-2017-0140180—8 pages (dated Nov. 20, 2018).
(Continued)

*Primary Examiner* — Brandi N Hopkins
(74) *Attorney, Agent, or Firm* — Knobbe Martens Olson & Bear LLP

(57) ABSTRACT

The described technology can quantitatively evaluate a material embrittlement behavior under various gaseous hydrogen environments (temperature and pressure). The described technology may include a small-punch test device allowing a specimen to be fixed inside a jig comprising upper and lower dies, gas to be filled at the lower part of the specimen, and a punch for applying force to be included at the upper part thereof so as to bend the specimen in a vertical downward direction under an environment of the influent gas and measure the same. The small-punch test device also includes an insulating container provided so as to encompass the jig therein and a temperature measuring device connected to the inside of the insulating container so as to (Continued)

measure the internal temperature of the insulating container and the temperature of the specimen. The small-punch test device further includes a heat transfer device transferring heat to the specimen.

6 Claims, 11 Drawing Sheets

(58) Field of Classification Search
CPC ............ G01N 3/08; G01N 15/08; G01N 3/10; G01N 17/002; G01N 25/18; G01N 15/0806; G01N 3/04; G01N 15/0826; C22C 38/02; C22C 38/04; Y02E 60/50; Y02E 60/32; Y02E 30/30; C21D 9/46; C21D 8/105; F17C 1/00
See application file for complete search history.

(56) References Cited

FOREIGN PATENT DOCUMENTS

| KR | 10-0306680 B1 | 9/2001 |
|---|---|---|
| KR | 10-2004-0075398 A | 8/2004 |
| KR | 10-1177429 B1 | 8/2012 |

OTHER PUBLICATIONS

Office Action of Korean Patent Application No. 10-2017-0140180—10 pages (dated May 24, 2019).
International Search Report and Written Opinion dated Dec. 11, 2018 in International Application No. PCT/KR2018/010789, in 11 pages.
International Preliminary Report on Patentability dated Apr. 28, 2020 in International Application No. PCT/KR2018/010789, in 7 pages.
Bae et al., "Influence of Punch Velocity on Gas Hydrogen Embrittlement Behaviors in SA372 Steel," *Transactions of the Korean Society of Mechanical Engineers A*, vol. 37, No. 12, The Korean Society of Mechanical Engineers, Dec. 2013, pp. 1497-1502.
Bae et al., "Construction of SP Test Procedure at Low Temperature for Gas Hydrogen Embrittlement Behavior Evaluation of Materials for Energy Applications," *Proceedings of 2017 KSME Spring Conference on Materials and Fracture Part*, The Korean Society of Mechanical Engineers, Apr. 2017, pp. 65-66.

* cited by examiner

SMALL-PUNCH TEST APPARATUS FOR QUANTITATIVELY EVALUATING MATERIAL EMBRITTLEMENT BEHAVIOR UNDER VARIOUS GASEOUS HYDROGEN ENVIRONMENTS

CROSS REFERENCE TO RELATED APPLICATIONS

This is a continuation application of International Patent Application No. PCT/KR2018/010789, filed on Sep. 13, 2018, which claims priority to Korean patent application No. 10-2017-0140180 filed on Oct. 26, 2017, contents of both of which are incorporated herein by reference in their entireties.

BACKGROUND

Technical Field

The described technology generally relates to a technique in respect to a small-punch test apparatus that can quantitatively evaluate material embrittlement behavior under various gaseous hydrogen environment (temperature and pressure).

Related Technology

In order to prevent greenhouse gas effects and global warming, measures are being taken to regulate $CO_2$ emissions and reduce fine particles emitted from automobiles. To this end, research on renewable energy, especially hydrogen energy, is actively conducted worldwide. With the commercialization and widespread availability of hydrogen fuel cell (EC) and fuel cell vehicles (FCVs), efforts are being made to expand and distribute hydrogen charging stations. As part of the development of renewable energy, related research is actively being conducted to ensure the safety of materials in respect to the production/storage/transport of hydrogen, and most of those studies focus on the safety design of high-pressure pressure containers. In particular, research and development are being performed by focusing on the establishment of the technology for evaluating mechanical properties according to hydrogen embrittlement (HE) of hydrogen energy equipment materials.

SUMMARY OF CERTAIN INVENTIVE ASPECTS

One inventive aspect is a small-punch test apparatus that can quantitatively evaluate material embrittlement behavior under various gaseous hydrogen environments, the small-punch test apparatus capable of creating a temperature environment that represents significant embrittlement properties during a small-punch test under various hydrogen gas environments, allowing a temperature of a specimen to easily reach a predetermined temperature within a short period of time, maintaining the predetermined temperature, and thus easily evaluating a temperature effect on embrittlement behavior of a metal material caused by bending deformation.

The test apparatus according to embodiments may serve as a hydrogen exposure chamber that may maintain a specimen at a high temperature under a pressurized hydrogen environment for a predetermined long period of time in accordance with a crystal structure and micro-organization of metal, thereby enabling the production of specimen charged with hydrogen. Further, the test apparatus according to the described technology may perform a small-punch test on the hydrogen-charged specimen at a predetermined temperature. Another non-limiting object of the described technology is to provide a small-punch test apparatus under various gaseous hydrogen environments (temperature and pressure) that meet a test condition in respect to internal hydrogen and external hydrogen required in accordance with a crystal structure of a metal material.

Another aspect is a small-punch test device in which a specimen is fixed in a jig including upper and lower dies, a lower side below the specimen is filled with gas, a punch configured to apply force is provided at an upper side, the small-punch test device being configured to bend and deform the specimen in a vertical downward direction and measure the bending deformation under an environment of influent gas; an insulating container provided to encompass the jig therein; a temperature measuring device connected to the inside of the insulating container so as to measure an internal temperature of the insulating container and a temperature of the specimen; a heat transfer device provided at an outer peripheral surface of the jig and configured to heat or cool the specimen by means of an external heat transfer means so as to transfer heat to the specimen; and a controller configured to control the heat transfer device in accordance with a preset temperature of the specimen.

The heat transfer device may include a pipe which is wound around the outer peripheral surface of the jig and in which a refrigerant or heating medium is circulated.

The heat transfer device may include a heating wire installed on the outer peripheral surface of the jig.

A tube connector configured to supply external gaseous hydrogen to the lower die may be penetratively connected to the insulating container and the lower die, and threaded portion may be formed at an end of the tube connector, such that a flow rate adjusting valve and a one-touch connector may be fastened to a gas supply side from the outside of the insulating container, and a pressure gauge may be connected to a gas discharge side.

The tube connectors may be coupled to both surfaces of a lower end of the lower die by welding so as to prevent a leak of high-pressure gas under a low-temperature environment.

The described technology can improve and use "Small-Punch Test Apparatus Under Corrosive Gas Environment (Korean Patent No. 10-1177429)" presented for room temperature testing. The described technology does not use expensive large equipment such as an autoclave. The described technology does not violate high-pressure gas regulations because the described technology treats a small amount of hydrogen even under a high-pressure gas environment of 40 MPa. The described technology uses a small specimen and thus may cool or heat the specimen to a preset temperature within a short period of time. The described technology derives a load-displacement diagram to the fracture of the specimen caused by vertical downward bending deformation of the specimen during the small-punch test in accordance with the preset temperature of the specimen under the high-pressure hydrogen gas environment. The described technology quantitatively derives breakdown patterns of materials caused by hydrogen embrittlement, absorbed energy when a material is broken, and a relative reduction of thickness of a fractured part. Therefore, the described technology enables screening of materials that are resistant to hydrogen embrittlement suitable for an environment in which equipment and component materials for hydrogen energy are applied.

The described technology may qualitatively identify a degree of hydrogen embrittlement resistance in conjunction with the load-displacement diagram by observing fracture patterns and fracture surfaces from the specimen collected after completion of the test. The described technology may distinguish, step by step, the ductile-brittle transition behavior caused by embrittlement of metal and alloy materials for hydrogen energy according to the test temperature.

In addition, the described technology measures a thickness of a compressively fractured part of the specimen after the small-punch test, and compares the measured thickness with a measured thickness of the specimen when tested under an inert gas environment, such as nitrogen, argon, and helium environments, thereby obtaining a reduction of thickness (RT) and a relative reduction of thickness (RRT) of the specimen caused by the hydrogen embrittlement. Accordingly, the described technology has a great advantage that it is possible to set a of the relative reduction of thickness (RRT) as a criterion when screening the materials resistant to the hydrogen embrittlement.

$$RRT(\%) = \frac{\text{REDUCTION OF THICKNESS ACCORDING TO } SP \text{ TEST UNDER HYDROGEN ENVIRONMENT } \left(\frac{t_0 - t_f}{t_0}\right) H_2}{\text{REDUCTION OF THICKNESS ACCORDING TO } SP \text{ TEST UNDER INERT GAS ENVIRONMENT } \left(\frac{t_0 - t_f}{t_0}\right) N_2, He, Ar}$$

BRIEF DESCRIPTION OF DRAWINGS

The foregoing and other objects, features, and advantages of the invention, as well as the following detailed description of the embodiments, will be better understood when read in conjunction with the accompanying drawings. Although certain embodiments are shown in the drawings, the invention is not intended to be limited to the details shown because various modifications and structural changes may be made therein without departing from the spirit of the invention and within the scope and range of equivalents of the claims. The use of the same reference numerals or symbols in different drawings indicates similar or identical items.

DETAILED DESCRIPTION OF CERTAIN INVENTIVE EMBODIMENTS

Figure 1:
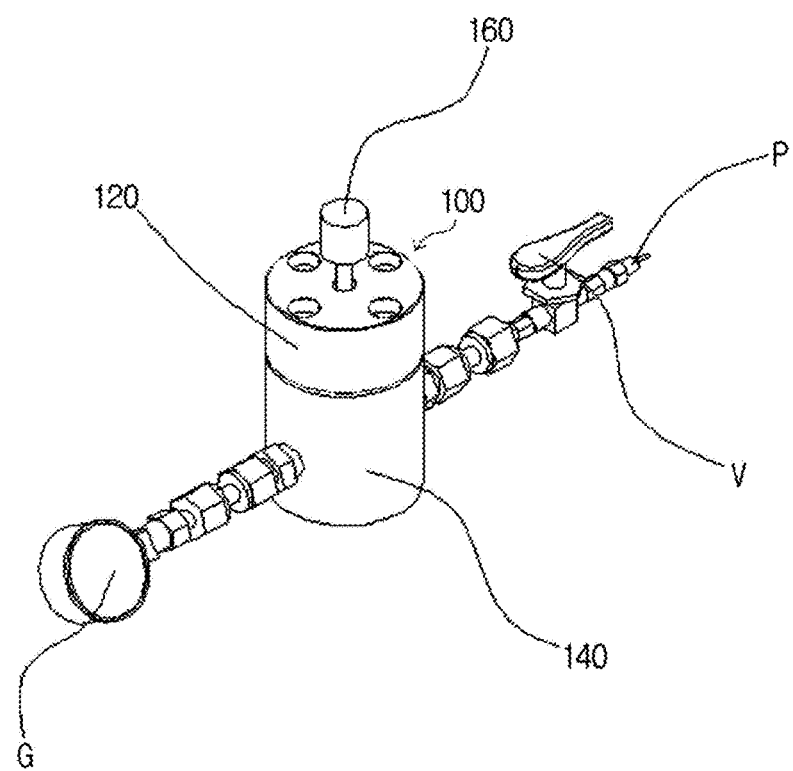
FIG. 1 is a perspective view of a small-punch test device according to some embodiments of the described technology.

Recently, with the expansion of the use of hydrogen energy, it is very important to ensure safety and reliability of vehicles loaded with high-pressure hydrogen gas, hydrogen storage tanks, containers, and vessels. Hydrogen atoms are very small in size and penetrate and diffuse into the inside of metal materials under high-pressure environments, which causes embrittlement. In order to select materials available for use as hydrogen energy equipment and component materials, the embrittlement behavior of the materials is identified because the chemical compositions and micro-organizations of the materials are different and the characteristics (conditions of applied pressure and temperature) of the environments in which the materials are used are different. In order to identify the embrittlement behavior of the materials, it is necessary to develop and distribute evaluation techniques using simple test methods that can obtain a large amount of data within a short period of time and identify the reliability of materials for long-term use. In this regard, the research team has previously devised and patented 'Small-Punch Test Apparatus Under Corrosive Gas Environment' as a simple test apparatus capable of evaluating hydrogen embrittlement behavior at room temperature. Meanwhile, hydrogen charging stations for fuel cell vehicles (FCVs) supply high-pressure hydrogen of 35 MPa or 70 MPa, and various structural and component materials are used to produce, store and transport hydrogen. Therefore, it is very important to evaluate the hydrogen embrittlement behavior of these materials. Because the hydrogen embrittlement of metal occurs more significantly under temperature environments such as low or high temperature as well as room temperature, it is difficult to cope with the hydrogen embrittlement of metal under vulnerable temperature and pressure environments with the small-punch test apparatus for room temperature that was previously filed and patented. Therefore, it is necessary to develop a simple test apparatus capable of evaluating hydrogen embrittlement behavior under low-temperature and high-temperature environments. Accordingly, along with the development and establishment of a small-punch test apparatus, it is necessary to establish a test method as a simple test method that takes into account the vulnerable temperature environment that occurs during the production, storage and transport of hydrogen, such as the environments in the storage tanks of the fuel cell vehicles (FCVs) and the hydrogen tanks of the hydrogen charging stations.

Many modifications to the above embodiments may be made without altering the nature of the invention. The dimensions and shapes of the components and the construction materials may be modified for particular circumstances. While various embodiments have been described above, it should be understood that they have been presented by way of example only, and not as limitations.

Hereinafter, some embodiments of the described technology will be described with reference to the accompanying drawings.

A configuration and an operation of a small-punch test apparatus according to some embodiments of the described technology, which has a function of evaluating embrittlement behavior of a material at predetermined temperature lower or higher than the at room temperature under a high-pressure hydrogen gas environment of a metal material for producing, transporting, and storing hydrogen energy.

The small-punch test apparatus capable of quantitatively evaluating material embrittlement behavior under various gaseous hydrogen environments according to the described technology broadly includes a small-punch test device, an insulating container, a temperature measuring device, a heat transfer device, and a controller.

First, the configuration of the small-punch test device according to some embodiments of the described technology will be briefly described, and the small-punch test device is identical to the patented 'Small-Punch Test Apparatus Under Corrosive Gas Environment' in the related art.

Figure 2:
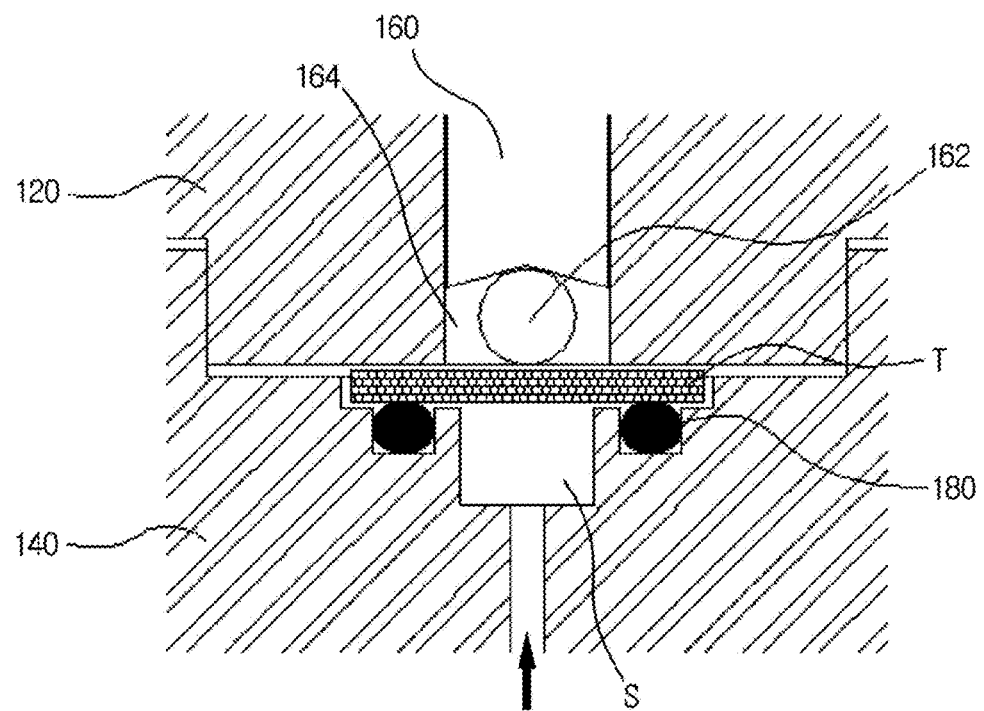
FIG. 2 is a cross-sectional view of the inside of FIG. 1.

Referring to FIGS. 1 and 2, in a small-punch test device 100, a specimen T is inserted and fixed in a jig including upper and lower dies 120 and 140. A punch 160 is installed in the upper die 120, and a pressing member 162 is provided below the punch 160.

In more detail, in the lower die 140, a space, which may come into contact with hydrogen gas or inert gas, is formed, and a sealed space, which is filled with gas, is formed to prevent a leak of the gas. A groove is formed in an upper portion of the lower die 140 so that the specimen T is inserted and positioned into the groove. An O-ring 180 made of a rubber material is positioned below the specimen T and disposed at a lower end of the groove to gas leakproof sealability. The upper die 120 is fixedly fastened to the lower die 140 to fix the specimen T and has a through hole formed at a center thereof. The punch 160 is positioned above the specimen T and inserted into the through hole of the upper die 120 to apply vertical force in a vertical downward direction. The pressing member 162 applies a load to the specimen T by being brought into direct contact with the specimen T by the punch 160. A puncher applies vertical force by being brought into contact with one side of an upper end of the punch. A flow rate adjusting valve V configured to adjust, discharge, open, and close influent gas is installed in the lower die. A one-touch connector is connected to the flow rate adjusting valve to in the direction the gas. A pressure gauge G is connected to the lower die and used to measure and identify a pressure of gas.

Figure 3:
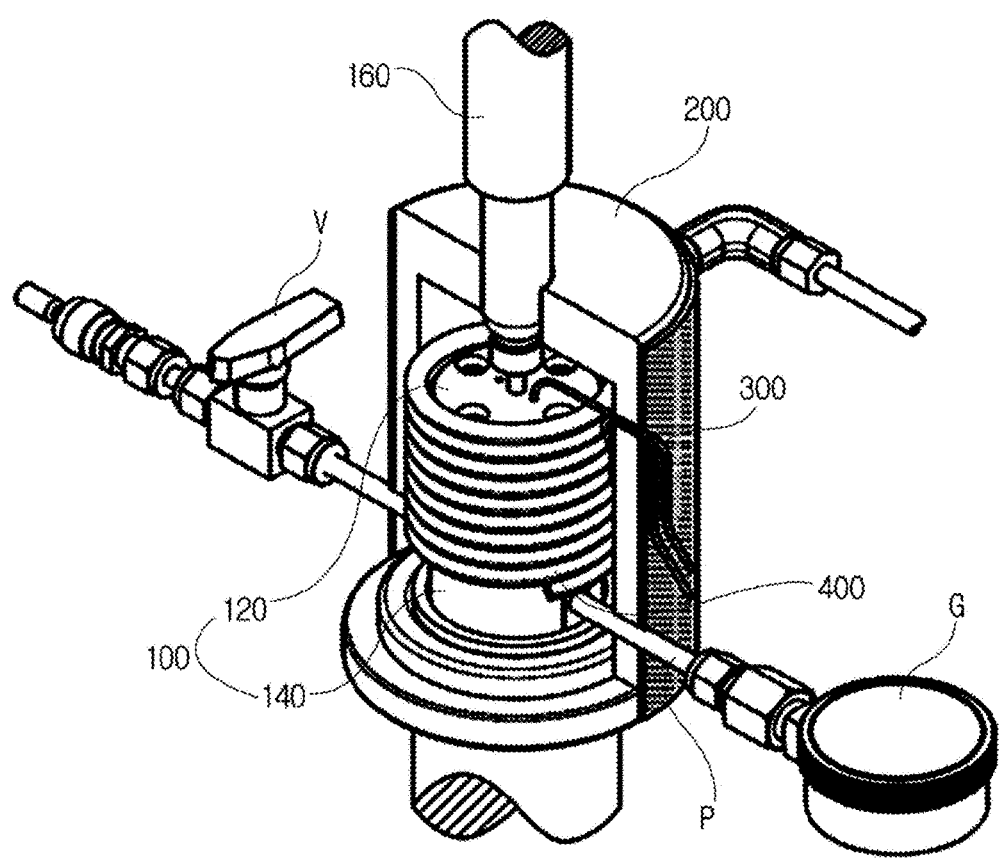
FIG. 3 is a perspective view illustrating the small-punch test apparatus capable of evaluating effects of a temperature and a pressure on embrittlement behavior of a material under various gaseous hydrogen environments for creating a low-temperature test environment according to some embodiments of the described technology.

Further, referring to FIG. 3, the small-punch test device 100 includes an insulating container 200, a temperature measuring device 300, a heat transfer device 400, and a controller (not illustrated).

The insulating container 200 has a capsule shape and may be made of a material that is sufficiently resistant to high-temperature and low-temperature environments and easy to prevent a thermal loss to the outside. The insulating container 200 includes container tube, upper cap, and lower cap or includes a container tube and a lower cap having the same outer diameter. A thermal insulation sheet may be wound around the outside the insulating container 200 for additional thermal insulation. The insulating container 200 may be made of various polymeric, ceramic, and composite materials that are easy to prevent a thermal loss to the outside.

Here, the insulating container 200 and the small-punch test device 100 may be supported in a horizontal state by a support made of a material having sufficient rigidity so that the punch 160 may apply a load in the vertical downward direction.

The upper cap and the lower cap of the insulating container 200 each may have a stepped portion having the same diameter as the inside of the container tube so that the upper cap and the lower cap may be inserted and fixed into upper and lower ends of the container tube.

Here, the insulating container 200 is seated on the support. So that the upper and lower dies 120 and 140 of the small-punch test device 100 are isolated in the container interior of the insulating container 200, the flow rate adjusting valve V, the one-touch connector, and the pressure gauge G are exposed to the room temperature environment outside the insulating container 200, except for tube connectors P which are connected and inserted into both surfaces of the lower end of the small-punch test device 100 and then welded. Both surfaces of the upper end of the lower cap and both surfaces of the lower end of the insulating container may have semi-circular grooves having diameters equal to the outer diameter of the tube connector P so that the upper and lower ends of the tube connectors are in contact with both surfaces of the upper end of the lower cap and both surfaces of the lower end of the insulating container.

The temperature measuring device 300 includes thermocouples to measure an internal temperature of the insulating container 200 and a temperature of a specimen.

Here, a pair of thermocouples is inserted into a through hole formed in one surface of the upper end of the upper die 120 of the small-punch test device 100 installed in the insulating container 200 and inserted into the insulating container 200 in order to measure, in real time, the amount of change in temperatures of the specimen and the amount of change in temperatures inside the insulating container 200.

Further, the thermocouples are included in the temperature measuring device 300 which is the configuration of the described technology. The amount of change in temperatures may be observed by the thermocouple, and signal data in respect to the measured and detected temperatures may be stored in real time in a storage medium.

The insulating container 200 may have a passing hole so that the thermocouple may be inserted into the insulating container 200, and the passing hole may be formed at a position set in consideration of a test environment.

A lower end of the puncher, which is configured to apply vertical force in the vertical downward direction to the punch 160 inserted into the upper die of the test apparatus, may be inserted into a through hole formed at a center of the upper cap and having the same diameter as the puncher.

The punch and the puncher may not be separated, the pressing member may not be used, and the punch and the puncher may be used as a single piece so that the lower end of the puncher may press a central portion of one surface of the specimen.

The above-mentioned configuration may have a structure for changing a temperature of the specimen fixed and fastened by the upper and lower dies 120 and 140 of the test apparatus. Although not illustrated in the drawings, the test apparatus having all the components may be installed to be isolated from the outside by a single constant-temperature chamber.

Here, the chamber may be made of a transparent material that may withstand high and low temperatures and allow a change of the pressure gauge G installed in the chamber to be easily observed from the outside when the temperature is adjusted.

Hereinafter, the small-punch test apparatus that can evaluate effects of a temperature and a pressure on embrittlement behavior of a metal material under various gaseous hydrogen environments according to some embodiments of the described technology will be described below in detail with reference to the accompanying drawings.

FIG. 3 is a perspective view illustrating the small-punch test apparatus capable of evaluating an effect of a temperature on embrittlement behavior of a material under a high-pressure hydrogen gas environment for creating a low-temperature environment according to some embodiments of the described technology.

As illustrated in FIG. 3, the small-punch test apparatus capable of evaluating an effect of a temperature on embrittlement behavior of a material under a high-pressure hydrogen gas environment for creating a low-temperature environment according to some embodiments of the described technology includes the small-punch test device 100, the insulating container 200, the temperature measuring device 300, and the heat transfer device 400.

The heat transfer device 400 may include a copper pipe, an air pump device (not illustrated), a refrigerant/temperature-raising heating medium storage container (not illustrated), and a pumping device (not illustrated).

The copper pipe having a coil shape is disposed outside the insulating container 200, the other portion of the copper pipe is elongated to the outside of the container tube, and an end of the other portion of the copper pipe is connected to an end of a discharge port of a refrigerant supply hose of the pumping device. The pumping device may be inserted and fixedly fastened into the refrigerant storage container, an air supply hose may be connected to an upper end of the pumping device, and the other end of the air supply hose may be connected to an air injection port of the air pump device.

Here, the use of the copper pipe may improve heat transfer efficiency.

The copper pipe is wound around the upper and lower dies 120 and 140 of the small-punch test device 100 in a longitudinal direction of the small-punch test device 100, and the other portion of the insulating container 200 has a length enough to supply the refrigerant from the outside of the insulating container 200 and discharge the vaporized refrigerant. The insulating container 200 may have a passing hole through which the other portion of the pipe may pass.

Figure 4:
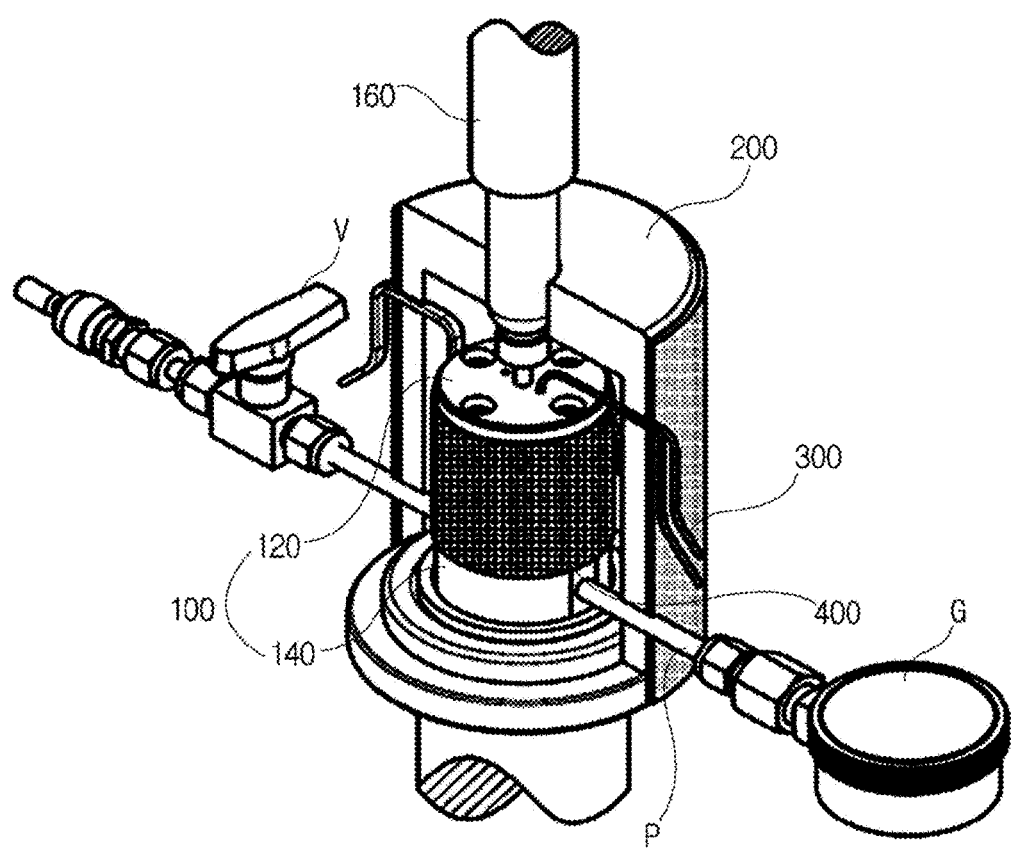
FIG. 4 is a perspective view illustrating the small-punch test apparatus capable of evaluating effects of a temperature and a pressure on embrittlement behavior of a material under various gaseous hydrogen environments for creating a high-temperature test environment according to some embodiments of the described technology.

FIG. 4 is a perspective view illustrating the small-punch test apparatus capable of evaluating an effect of a temperature on embrittlement behavior of a material under a high-pressure hydrogen gas environment for creating a high-temperature environment according to some embodiments of the described technology.

As illustrated in FIG. 4, the small-punch test apparatus capable of evaluating an effect of a temperature on embrittlement behavior of a material under a high-pressure hydrogen gas environment by creating a high-temperature environment according to some embodiments of the described technology includes the small-punch test device 100, the insulating container 200, the temperature measuring device 300, and the heat transfer device 400, and the heat transfer device 400 includes a heating wire pad.

The heating wire pad is wound around the upper and lower dies of the test apparatus in the longitudinal direction of the test apparatus and includes a heating wire. A power inlet line of the heating wire may be exposed to the outside through a passing hole in the insulating container 200 and connected to a temperature adjusting module of the controller at the outside of the insulating container 200. A temperature of the heating wire may be set to a target temperature by adjusting intensity of electric current.

Figure 5:
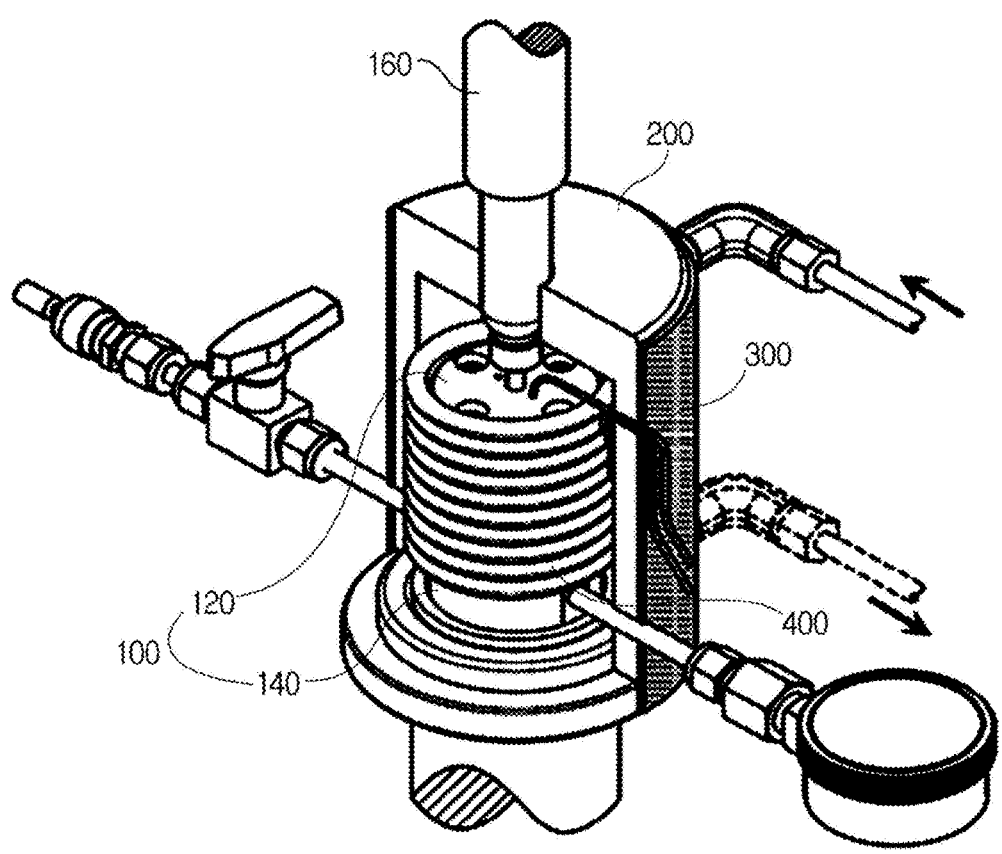
FIG. 5 is a perspective view of the small-punch test apparatus capable of evaluating effects of a temperature and a pressure on embrittlement behavior of a material under various gaseous hydrogen environments for creating a predetermined temperature environment by circulating a circulation refrigerant or a high-temperature heat medium according to some embodiments of the described technology.

FIG. 5 is a perspective view illustrating the small-punch test apparatus capable of evaluating effects of a temperature and a pressure on embrittlement behavior of a material under a low-temperature environment or under various gaseous hydrogen environments by circulating a refrigerant or a high-temperature heat medium according to some embodiments of the described technology.

As illustrated in FIG. 5, the variable-temperature small-punch test apparatus for evaluating embrittlement behavior of a material under a high-pressure hydrogen gas environment by creating a low-temperature or high-temperature environment by circulating a refrigerant or high-temperature heat medium through a copper pipe according to some embodiments of the described technology includes the small-punch test device 100, the insulating container 200, the temperature measuring device 300, the heat transfer device 400, the controller (not illustrated), a refrigerant/heat medium circulating/pressurizing pump (not illustrated), and a refrigerant/heat medium supply device (not illustrated).

The heat transfer device 400 includes a coil type copper pipe and is wound around the upper and lower dies 120 and 140 of the small-punch test device 100 in the longitudinal direction of the small-punch test device 100. The refrigerant and the heat medium are circulated in the pipe, such that a temperature of the specimen is controlled to reach a predetermined temperature by heat transfer through the upper and lower dies 120 and 140. The pipe may be exposed to the outside through a passing hole in the insulating container 200 and connected to a temperature adjusting module at the outside of the insulating container 200 by the controller.

Figure 6:
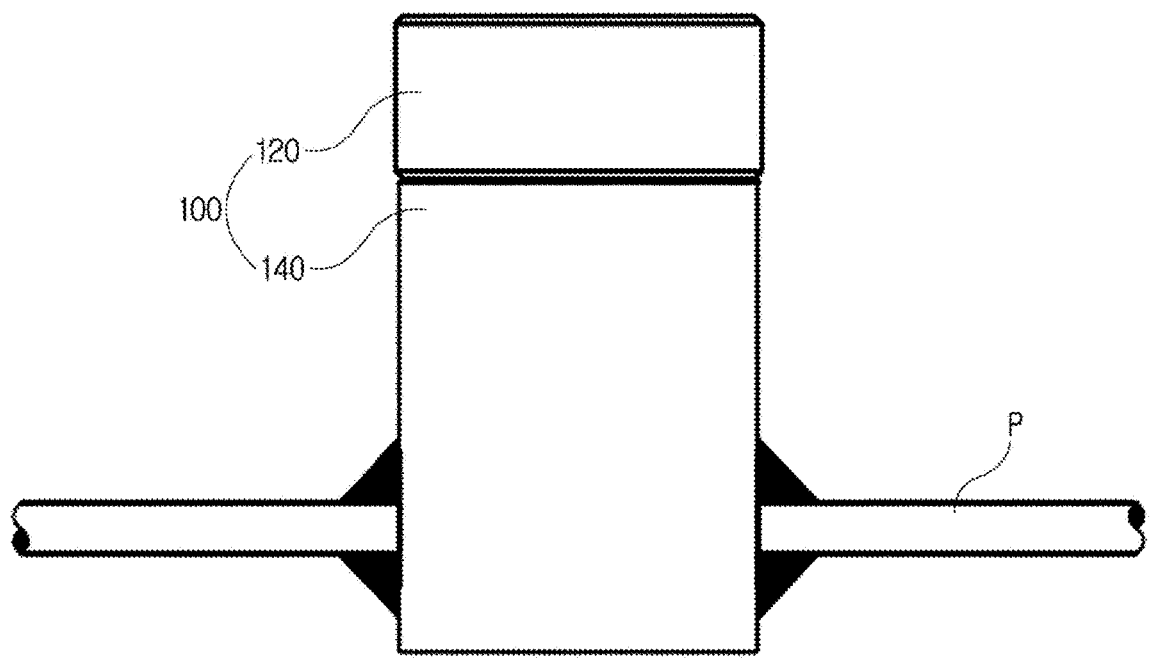
FIG. 6 is an enlarged view illustrating a welded structure between lower ends of upper and lower dies and tube connectors of the small-punch test apparatus capable of prevent a leak of hydrogen gas despite a great temperature difference during a process of evaluating an effect of a temperature on embrittlement behavior of a material under high-pressure hydrogen gas environment according to some embodiments of the described technology.

FIG. 6 is an enlarged view illustrating welded parts where both ends of the tube connectors P are connected to the lower end of the lower die 140 of the small-punch test device 100. Therefore, the welded parts may prevent a decrease in pressure caused by a leak of high-pressure gas through a piping fitting and prevent a leak of gas caused during a long-term test despite a difference in coefficient of thermal expansion between components when cooling the specimen to a low temperature. The welding processing (such as MIG, TIG, arc, brazing, or laser welding) may be applied.

Here, a threaded portion is formed at one side of the tube connector P such that the tube connector P may be fastened by means of a fitting, and the tube connector P is formed in the form of a tube having a predetermined length or an adjustable length, such that the tube connectors P are inserted into the surfaces at both ends of the lower side of the lower die 140 and then fixed by welding, thereby preventing a deterioration in gas leakproof sealability at the screw fastening fitting which is caused by a difference in coefficient of thermal expansion when cooling the specimen at a low temperature and raising a temperature to a high temperature. When the upper and lower dies 120 and 140 are isolated from the outside by the insulating container 200, the flow rate adjusting valve, the one-touch connector, and the pressure gauge are configured to be exposed to the room temperature, thereby prevent respective fastening units from undergoing a difference in temperature.

Figure 7:
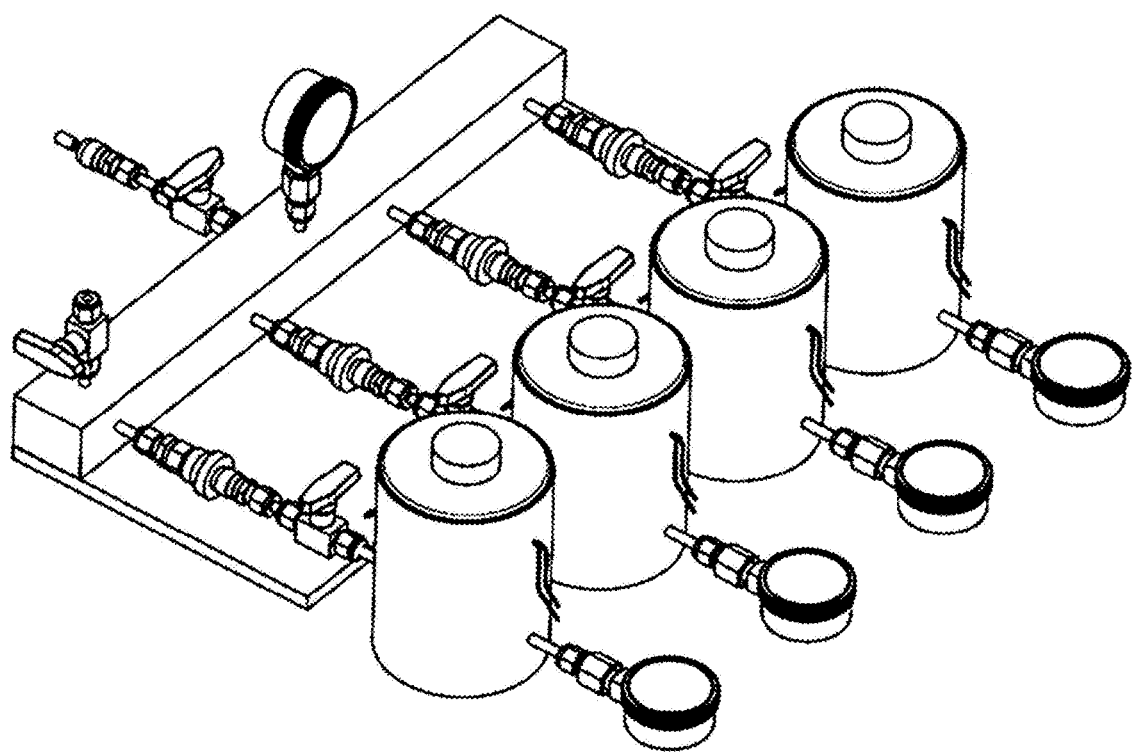
FIG. 7 is a perspective view illustrating a hydrogen exposure chamber including multiple cartridges capable of charging a specimen having an austenite structure with hydrogen by maintaining the specimen particularly under a high-temperature environment for a long period of time in the small-punch test apparatus capable of evaluating an effect of a temperature on embrittlement behavior of material under a high-pressure hydrogen gas environment according to some embodiments of the described technology.

With the above-mentioned configuration, if necessary, the test apparatus may serve as a hydrogen exposure chamber that may embrittle the specimen by exposing the specimen to high-pressure pressurized gaseous hydrogen for a long period of time at a predetermined temperature higher or lower than the room temperature, and maintaining the exposed state for a long period of time so that the specimen is charged with hydrogen, as illustrated in FIG. 7. In addition, the test apparatus has multiple cartridges that may be connected and separated, and thus the test apparatus may be easily carried and moved, such that the temperature effect on the embrittlement behavior of materials under the high-pressure hydrogen gas environment may be evaluated.

Figure 8:
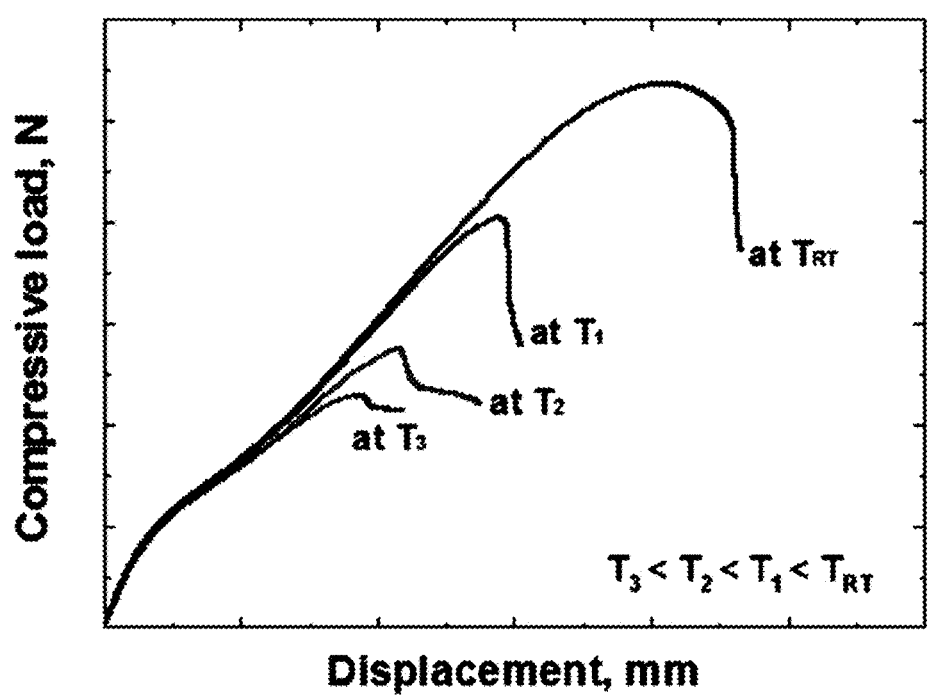
FIG. 8 is a graph illustrating a load-displacement diagram obtain at respective predetermined temperatures derived by the small-punch test apparatus capable of evaluating effects of a temperature and a pressure on embrittlement behavior of a material under various gaseous hydrogen environments according to some embodiments of the described technology.
Figure 9:
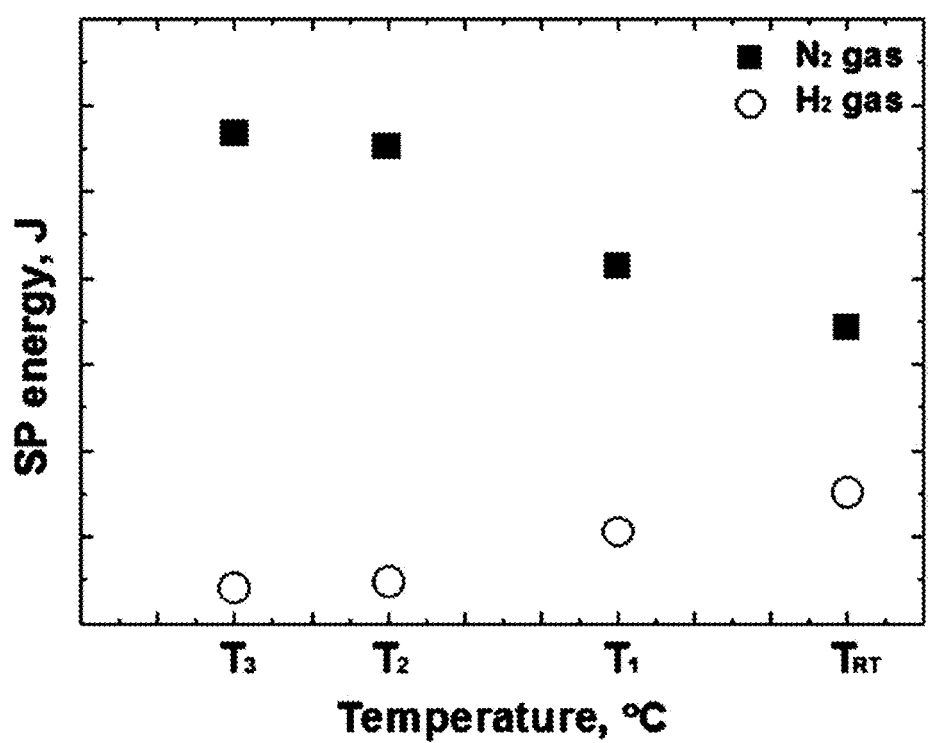
FIG. 9 is a graph illustrating values of absorbed energy (SP energy) during fracture with respect to test temperatures under high-pressure $N_2$ gas and $H_2$ gas, in which the values of absorbed energy are obtained by integrating an area below the load-displacement diagram derived by the small-punch test apparatus capable of evaluating an effect of a temperature on embrittlement behavior of a material under a high-pressure hydrogen gas environment of 10 MPa according to some embodiments of the described technology.

With the above-mentioned configuration, the small-punch test apparatus according to some embodiments of the described technology, which has the function of adjusting a temperature for evaluating material embrittler rent behavior under a high-pressure hydrogen gas environment. Therefore, as illustrated in FIG. 8, based on the small-punch (SP) test, it is possible to derive a load-displacement diagram in respect to the material used in the test, and to obtain a value of small-punch (SP) energy corresponding to absorbed energy during the fracture by integrating an area below the load-displacement diagram. The values of the small-punch energy with respect to the test temperatures may be illustrated in FIG. 9.

Figure 10:
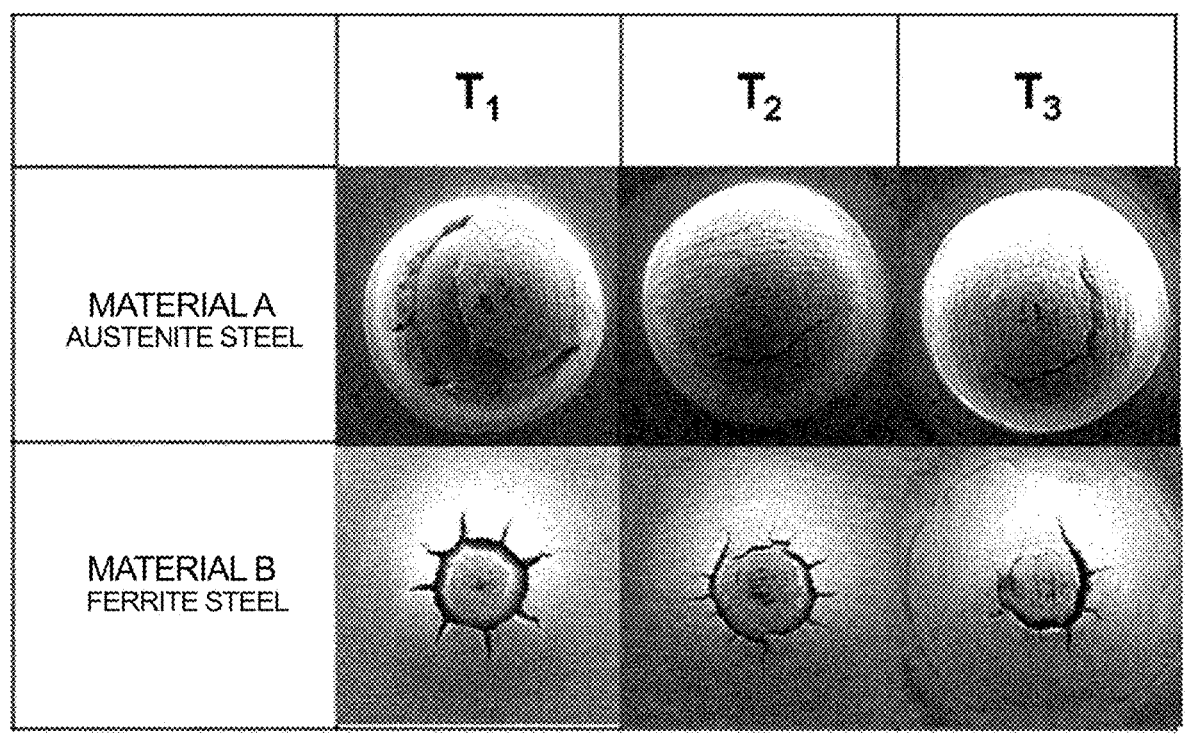
FIG. 10 is an image illustrating damage, destruction, and fracture patterns of a specimen fractured by the small-punch test apparatus capable of evaluating an effect of a temperature on embrittlement behavior of a material under a high-pressure hydrogen gas environment according to some embodiments of the described technology.

In addition, it is possible to identify the fracture patterns of the specimen collected after the small pouch test through optical and scanning electron microscopy observations as illustrated in FIG. 10, and it is possible to identify the ductile-brittle transition behavior.

Figure 11:
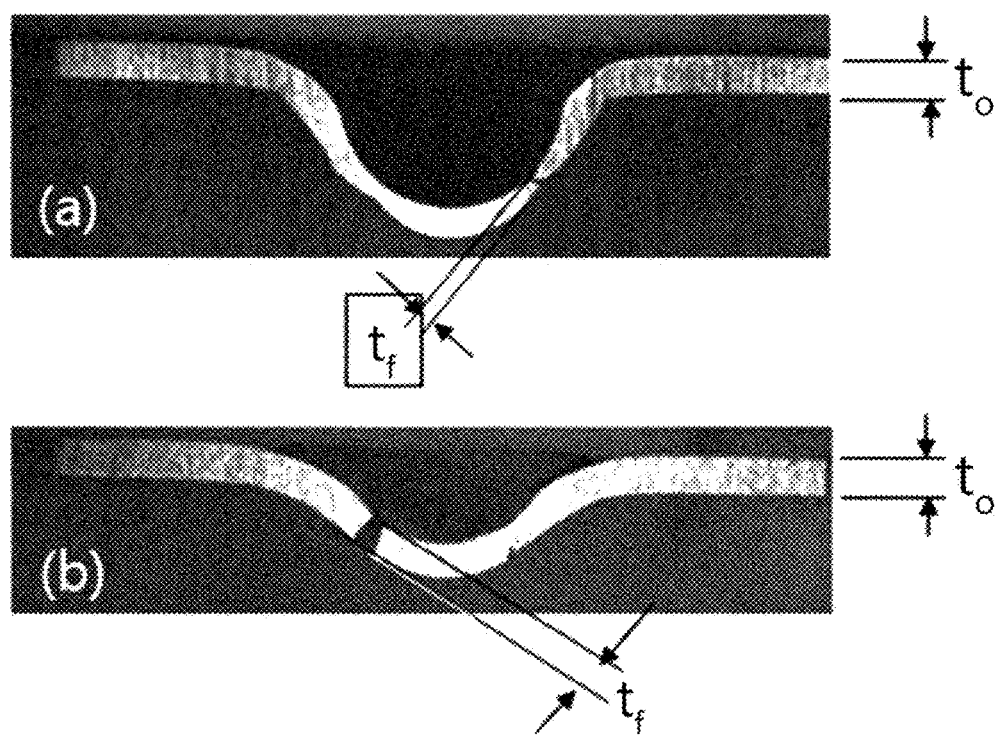
FIG. 11 is an image illustrating cross section patterns of a fractured part of a specimen fractured by the small-punch test apparatus capable of evaluating an effect of a temperature on embrittlement behavior of a material under a high-pressure inert gas and hydrogen gas environment according to some embodiments of the described technology.

In addition, the described technology measures, with a needle type micrometer, a remaining thickness of a compressively fractured part of the specimen collected after the small-punch test, and compares the measured thickness with a measured thickness of the specimen when tested under an inert gas environment, such as nitrogen, argon, and helium environments as illustrated in FIG. 11A, thereby obtaining a reduction of thickness and a relative reduction of thickness (RRT) of the specimen caused by the hydrogen embrittlement under the gaseous hydrogen environment as illustrated in FIG. 11B. Accordingly, it is possible to set a value of the relative reduction of thickness (RRT) as a quantitative criterion when screening the materials resistant to the hydrogen embrittlement. Here, $t_o$ represents a thickness of the specimen before the SP test, and $t_f$ represents a thickness of a fractured part of the specimen measured after the SP test.

The relative reduction of thickness (RRT) obtained in this case may be obtained by means of the following formula.

$$RRT(\%) = \frac{\text{REDUCTION OF THICKNESS ACCORDING TO } SP \text{ TEST UNDER HYDROGEN ENVIRONMENT}\left(\frac{t_0 - t_f}{t_0}\right)H_2}{\text{REDUCTION OF THICKNESS ACCORDING TO } SP \text{ TEST UNDER INERT GAS ENVIRONMENT}\left(\frac{t_0 - t_f}{t_0}\right)N_2, H_e, Ar}$$

Some embodiments is just for illustration, and those skilled in the art may implement various modified exemplary embodiments regarding the evaluation of hydrogen embrittlement behavior.

Accordingly, the true technical protection scope of the described technology should be determined by the technical spirit of the inventions defined by the appended claims and should cover various modified exemplary embodiments as well as the above-mentioned exemplary embodiment.

It can be seen that the basic technical spirit of the described technology is to provide the small-punch test apparatus capable of quantitatively evaluating material embrittlement behavior under various gaseous hydrogen environments, and various modifications may be made by those skilled in the art without departing from the basic spirit of the described technology.

What is claimed is:

1. A small-punch test apparatus for quantitatively evaluating material embrittlement behavior under various gaseous hydrogen environments, the small-punch test apparatus comprising:
    a small-punch test device comprising a jig including upper and lower dies, and a punch provided at the upper die and configured to apply force, wherein a specimen is configured to be fixed in the jig, wherein the lower die below the specimen is filled with gas, and wherein the small-punch test device is configured to bend and deform the specimen in a vertical downward direction and measure the bending deformation under an environment of influent gas;
    an insulating container configured to encompass the jig therein;
    a temperature measuring device connected to the inside of the insulating container so as to measure an internal temperature of the insulating container and a temperature of the specimen;
    a heat transfer device provided at an outer peripheral surface of the jig and configured to heat or cool the specimen by means of an external heat transfer means so as to transfer heat to the specimen; and
    a controller configured to control the heat transfer device in accordance with a preset temperature of the specimen.

2. The small-punch test apparatus of claim 1, wherein the heat transfer device comprises a pipe wound around the outer peripheral surface of the jig, and wherein a refrigerant or heating medium is configured to be ted in the pipe, such that the heat is transferred to the specimen by thermal conduction.

3. The small-punch test apparatus of claim 1, wherein the heat transfer device is wound around the outer peripheral surface of the jig, and wherein a vaporized low-temperature refrigerant gas is configured to be supplied into the heat transfer device and injected into the insulating container.

4. The small-punch test apparatus of claim 1, wherein the heat transfer device comprises a heating wire installed on the outer peripheral surface of the jig, and wherein a temperature is adjusted by the controller.

5. The small-punch test apparatus of claim 1, further comprising a tube connector configured to supply external gaseous hydrogen to the lower die and penetratively connected to the insulating container and the lower die, wherein a threaded portion is formed at an end of the tube connector, such that a flow rate adjusting valve and a one-touch connector are fastened to a gas supply side from the outside of the insulating container, and wherein a pressure gauge is connected to a gas discharge side.

6. The small-punch test apparatus of claim 5, wherein the tube connector is coupled to both surfaces of a lower end of the lower die by welding so as to prevent a leak of high-pressure gas under a low-temperature environment.

* * * * *

UNITED STATES PATENT AND TRADEMARK OFFICE
CERTIFICATE OF CORRECTION

PATENT NO. : 11,156,535 B2
APPLICATION NO. : 16/789859
DATED : October 26, 2021
INVENTOR(S) : Shin et al.

Page 1 of 1

It is certified that error appears in the above-identified patent and that said Letters Patent is hereby corrected as shown below:

In the Specification

In Column 3 at Line 18, delete "a" and insert --a value--.

In Column 3 at Line 51, delete "1," and insert --1.--.

In Column 6 at Line 60, delete "connectors" and insert --connectors P--.

In Column 9 at Line 47, delete "embrittler rent" and insert --embrittlement--.

In the Claims

In Column 11, Line 2, Claim 2, delete "ted" and insert --circulated--.

Signed and Sealed this
Third Day of May, 2022

Katherine Kelly Vidal
*Director of the United States Patent and Trademark Office*